(12) United States Patent
Sher et al.

(10) Patent No.: US 11,086,759 B2
(45) Date of Patent: Aug. 10, 2021

(54) SYSTEM AND METHOD FOR PROBE INJECTION FOR CODE COVERAGE

(71) Applicant: SEALIGHTS TECHNOLOGIES LTD., Kfar Saba (IL)

(72) Inventors: Eran Sher, Kfar Saba (IL); Alon Eizenman, Kfar Saba (IL); Nadav Yeheskel, Kfar Saba (IL); Alon Weiss, Kfar Saba (IL)

(73) Assignee: SeaLights Technologies LTD, Kfar Saba (IL)

( * ) Notice: Subject to any disclaimer, the term of this patent is extended or adjusted under 35 U.S.C. 154(b) by 0 days.

(21) Appl. No.: 16/583,540

(22) Filed: Sep. 26, 2019

(65) Prior Publication Data

US 2020/0104239 A1    Apr. 2, 2020

Related U.S. Application Data

(60) Provisional application No. 62/737,162, filed on Sep. 27, 2018.

(51) Int. Cl.
*G06F 9/44*     (2018.01)
*G06F 11/36*    (2006.01)

(52) U.S. Cl.
CPC .............................. *G06F 11/3644* (2013.01)

(58) Field of Classification Search
CPC ............ G06F 11/3644; G06F 11/3612; G06F 11/3628; G06F 11/362; G06F 11/3452
USPC ....................................................... 717/130
See application file for complete search history.

(56) References Cited

U.S. PATENT DOCUMENTS

| | | | |
|---|---|---|---|
| 5,778,169 A | 7/1998 | Reinhardt | |
| 7,028,290 B2 | 4/2006 | Srivastava | |
| 7,178,131 B2 | 2/2007 | Mitchell | |
| 7,281,242 B2 | 10/2007 | Inamdar | |
| 7,530,060 B1 | 5/2009 | Fontenot | |
| 7,774,663 B2 | 8/2010 | Kapur | |
| 7,836,367 B2 | 11/2010 | Kapur | |
| 7,856,332 B2 | 12/2010 | Karthikeyan | |
| 7,868,780 B2 | 1/2011 | Engel | |
| 7,899,661 B2 | 3/2011 | Rompaey | |
| 7,900,105 B2 | 3/2011 | Kapur | |
| 7,962,905 B2 | 6/2011 | Inamdar | |

(Continued)

FOREIGN PATENT DOCUMENTS

| | | |
|---|---|---|
| CN | 102419728 | 4/2012 |
| CN | 102419728 A | 4/2012 |

(Continued)

OTHER PUBLICATIONS

Title: The dynamic probe class library-an infrastructure for developing instrumentation for performance tools, author: L DeRose, published on 2001 Source: IEEE.*

(Continued)

*Primary Examiner* — Chameli Das
(74) *Attorney, Agent, or Firm* — Graeser Associates International Inc; Dvorah Graeser

(57) ABSTRACT

A system and methods for efficiently injecting probes to executable code, which is then executed. Such probes may be used for example to examine the behavior of the code during execution. Optionally analyzing the behavior of the code during execution is used as part of a testing strategy for the code.

16 Claims, 7 Drawing Sheets

(56) References Cited

U.S. PATENT DOCUMENTS

| | | |
|---|---|---|
| 7,966,346 B1 | 6/2011 | Jameson |
| 7,975,257 B2 | 7/2011 | Fanning |
| 8,079,018 B2 | 12/2011 | Huene |
| 8,205,191 B1 | 6/2012 | Kolawa |
| 8,266,563 B2 | 9/2012 | Plaza |
| 8,386,972 B2 | 2/2013 | Hakewill |
| 8,468,503 B2 | 6/2013 | Grosse |
| 8,473,907 B1 | 6/2013 | Zandi |
| 8,516,434 B2 | 8/2013 | McPeak |
| 8,521,499 B1 | 8/2013 | Rompaey |
| 8,522,221 B1 | 8/2013 | Braun |
| 8,543,367 B1 | 9/2013 | Van Rompaey |
| 8,578,344 B2 | 11/2013 | Godefroid |
| 8,739,135 B2 | 5/2014 | Eigler |
| 8,762,918 B2 | 6/2014 | Ni |
| 8,832,640 B1 | 9/2014 | Roche |
| 8,898,647 B2 | 11/2014 | Sobolev |
| 8,938,729 B2 | 1/2015 | Martin |
| 9,075,914 B2 | 7/2015 | Huggins |
| 9,141,807 B2 | 9/2015 | Chou |
| 9,170,847 B2 | 10/2015 | Huggins |
| 9,389,986 B2 | 7/2016 | Abraham |
| 9,559,928 B1 | 1/2017 | Porter |
| 2003/0212988 A1* | 11/2003 | Tsai ............... G06F 9/4484 717/130 |
| 2005/0166094 A1 | 7/2005 | Blackwell |
| 2005/0229165 A1* | 10/2005 | Ma ............... G06F 11/3676 717/130 |
| 2006/0179350 A1 | 8/2006 | Nathan |
| 2006/0195724 A1* | 8/2006 | Filho ............... G06F 11/3466 714/35 |
| 2007/0006041 A1 | 1/2007 | Brunswig |
| 2007/0074175 A1 | 3/2007 | Bengtsson |
| 2007/0103175 A1* | 5/2007 | Eigler ............... G06F 11/3466 717/158 |
| 2008/0120602 A1 | 5/2008 | Comstock |
| 2008/0141224 A1 | 6/2008 | Kawasaki |
| 2009/0144698 A1 | 6/2009 | Fanning |
| 2009/0249305 A1* | 10/2009 | Li ............... G06F 11/3676 717/130 |
| 2009/0287729 A1 | 11/2009 | Chen |
| 2009/0327680 A1* | 12/2009 | Dale ............... G06F 21/575 713/2 |
| 2010/0058295 A1 | 3/2010 | Johnson |
| 2012/0084756 A1 | 4/2012 | Subramanian |
| 2012/0167057 A1* | 6/2012 | Schmich ............... G06F 11/3644 717/130 |
| 2012/0198421 A1 | 8/2012 | Arumugham |
| 2012/0222014 A1 | 8/2012 | Peretz |
| 2012/0233596 A1 | 9/2012 | Adler |
| 2013/0125096 A1 | 5/2013 | Kruetzfeldt |
| 2013/0346046 A1 | 12/2013 | Rompaey |
| 2013/0346947 A1 | 12/2013 | Braverman |
| 2014/0007090 A1 | 1/2014 | Rugina |
| 2014/0047538 A1 | 2/2014 | Scott |
| 2014/0059399 A1 | 2/2014 | Kapur |
| 2014/0096113 A1 | 4/2014 | Kuehlmann |
| 2014/0173564 A1 | 6/2014 | Crawford |
| 2014/0189641 A1 | 7/2014 | Anderson |
| 2014/0331206 A1 | 11/2014 | Abraham |
| 2014/0351793 A1 | 11/2014 | Bartley |
| 2015/0007140 A1 | 1/2015 | Boshernitsan |
| 2015/0026121 A1 | 1/2015 | Shani |
| 2015/0052501 A1 | 2/2015 | Shani |
| 2015/0095703 A1 | 4/2015 | Girmonsky |
| 2015/0381467 A1 | 12/2015 | Girmonsky |
| 2016/0026559 A1 | 1/2016 | Geheb |
| 2016/0259714 A1 | 9/2016 | Shor |
| 2016/0299759 A1* | 10/2016 | Krajec ............... G06F 11/3692 |
| 2017/0003948 A1 | 1/2017 | Iyer |
| 2019/0236012 A1* | 8/2019 | Gschwind ............ G06F 13/1663 |
| 2020/0084152 A1* | 3/2020 | Zhang ............... H04L 41/5038 |
| 2021/0018887 A1* | 1/2021 | Brown ............... G05B 19/29 |
| 2021/0029170 A1* | 1/2021 | Gupta ............... G06F 21/554 |

FOREIGN PATENT DOCUMENTS

| | | |
|---|---|---|
| CN | 102722436 | 10/2012 |
| CN | 102722436 A | 10/2012 |
| CN | 102722436 B | 10/2012 |
| CN | 103631707 A | 3/2014 |
| CN | 103631707 B | 3/2014 |
| CN | 103699476 | 4/2014 |
| CN | 103699476 A | 4/2014 |
| CN | 104598378 | 5/2015 |
| CN | 104598378 B | 5/2015 |
| CN | 105224460 | 1/2016 |
| CN | 105224460 A | 1/2016 |
| CN | 106326118 | 1/2017 |
| CN | 106326118 A | 1/2017 |
| KR | 100990777 | 6/2008 |
| KR | 100990777 B1 | 6/2008 |
| KR | 20150007806 | 1/2015 |
| KR | 20150007806 A | 1/2015 |
| WO | 2013115797 A1 | 8/2013 |

OTHER PUBLICATIONS

Capturing malware propagations with code injections and code-reuse attacks, author: D Korczynski, et al, published on 2017; Source ACM SIGSAC.*

Valgrind: a framework for heavyweight dynamic binary instrumentation author: N Nethercore et al, published on 2007; source ACM Sigplan.*

Extended European Search Report for App No. EP17838916.9, dated Apr. 14, 2020, 12 pages.

Office Action dated Jul. 30, 2020 for U.S. Appl. No. 16/323,263 (pp. 1-60).

* cited by examiner

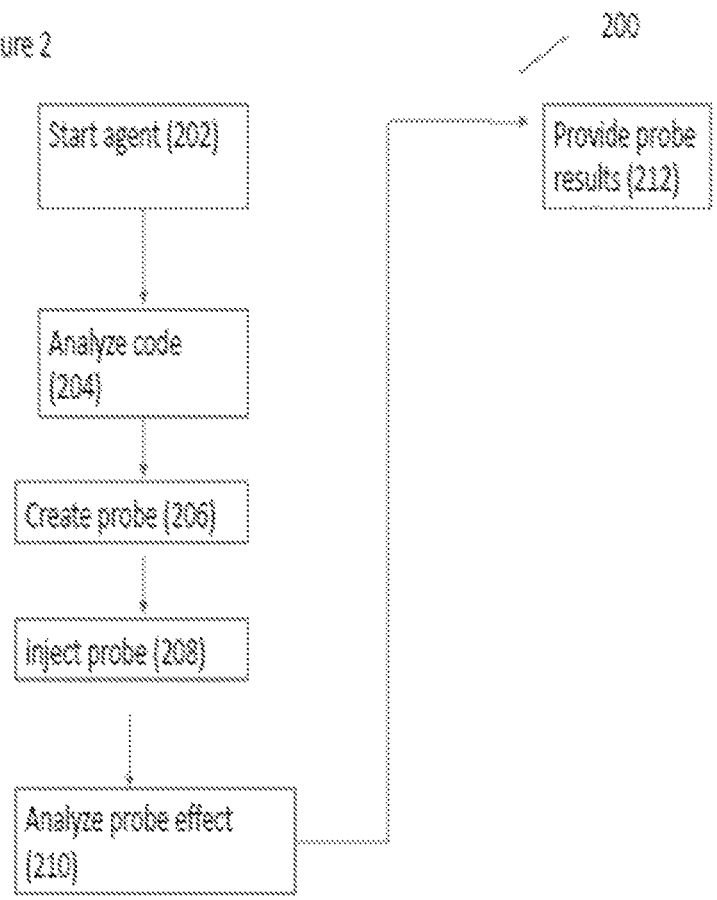

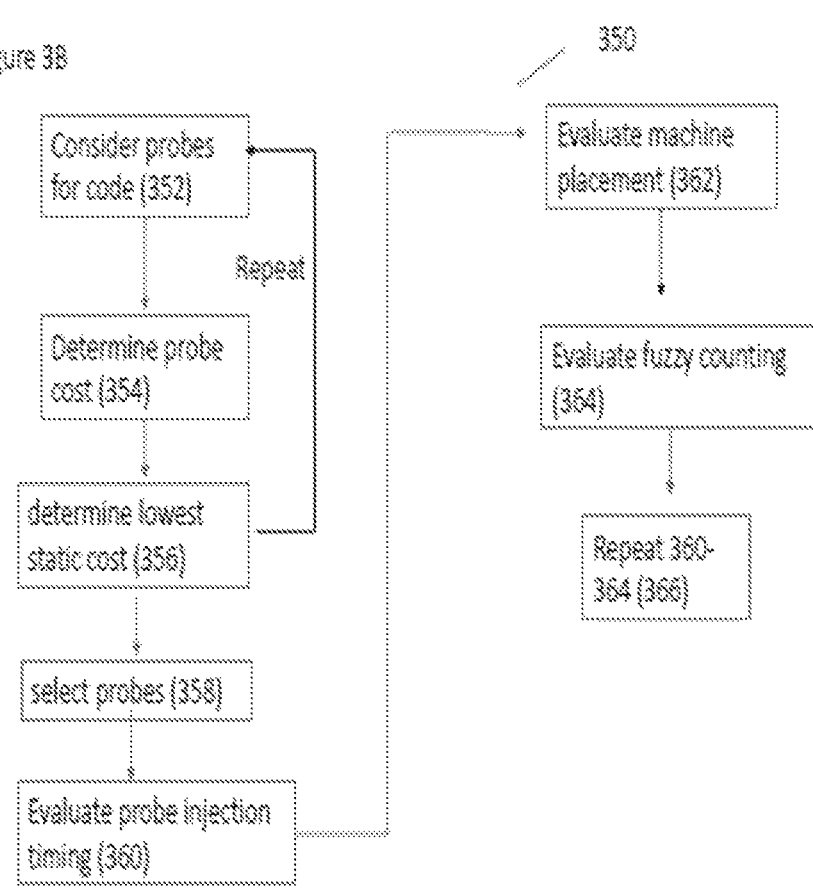

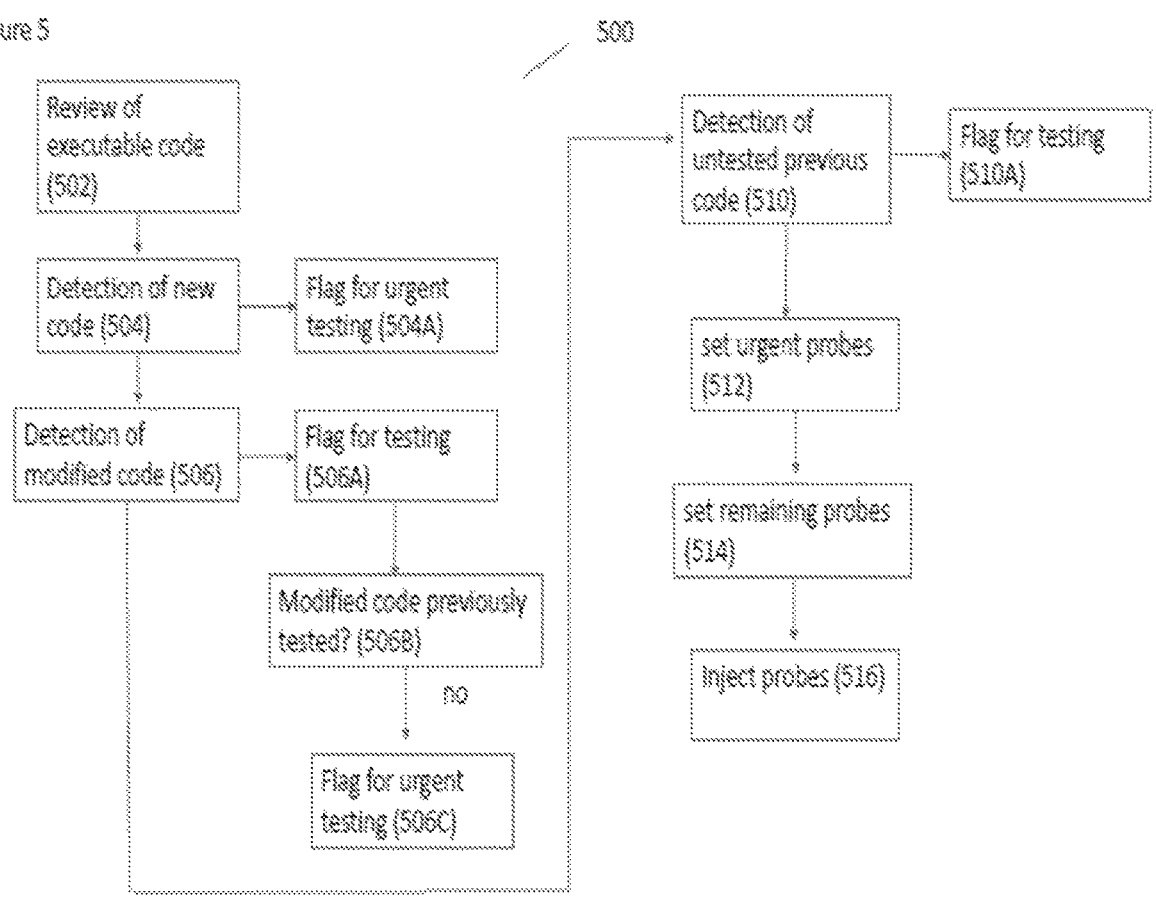

SYSTEM AND METHOD FOR PROBE INJECTION FOR CODE COVERAGE

FIELD OF THE INVENTION

The present invention is of a system and method for probe injection and in particular, of such a system and method for efficiently injecting probes to executable code for execution to determine code coverage.

BACKGROUND OF THE INVENTION

Various methods are known in the art to be able to inject probes into executable code, in order to analyze the behavior of the code during execution. For example, U.S. Pat. No. 7,962,905 relates to bytecode optimization and testing with probes for java. Probes are injected into compiled code.

U.S. Pat. No. 7,178,131 describes a method for analyzing runtime behavior of a program by injecting probes that cause minimum perturbation.

KR20150007806 describes a method for determining test coverage of a multi-threaded software.

CN105224460 relates to the use of probes to determine test coverage.

CN102419728A describes methods for analyzing code when probes are injected for determining test coverage.

US20090287729 relates to the injection of non-executable code to determine test coverage.

BRIEF SUMMARY OF THE INVENTION

The present invention overcomes the drawbacks of the background art by providing a system and method for efficiently injecting probes to executable code, which is then executed to determine code coverage. Preferably such coverage is determined in such a way that causes a minimum performance impact. For example, optionally the probes are injected to determine coverage with the aid of statistical analysis. The probe behavior may be used to determine how the users interact with the code. Time sensitive and/or performance sensitive measures are preferably used for probe injection. Such probes may be used for example to examine the behavior of the code during execution. Optionally analyzing the behavior of the code during execution is used as part of a testing strategy for the code.

Without wishing to be limited by a closed list, the techniques described herein may be used to collect coverage information from production systems with minimal impact on the CPU and RAM resources of the host machines.

The background art does not relate to time sensitive and/or performance sensitive measures for probe injection. The background art does not relate to statistical measures for determining coverage through probe injection, which supports minimum impact on the code execution.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 2 shows a non-limiting exemplary method according at least some embodiments for creating and/or selecting one or more probes and then determining their effect on injecting into the code;

FIGS. 3A and 3B show non-limiting, exemplary methods for probe cost determination;

FIG. 5 shows a non-limiting exemplary method for determining code which may be executed according test coverage.

DESCRIPTION OF AT LEAST SOME EMBODIMENTS

Figure 1A:
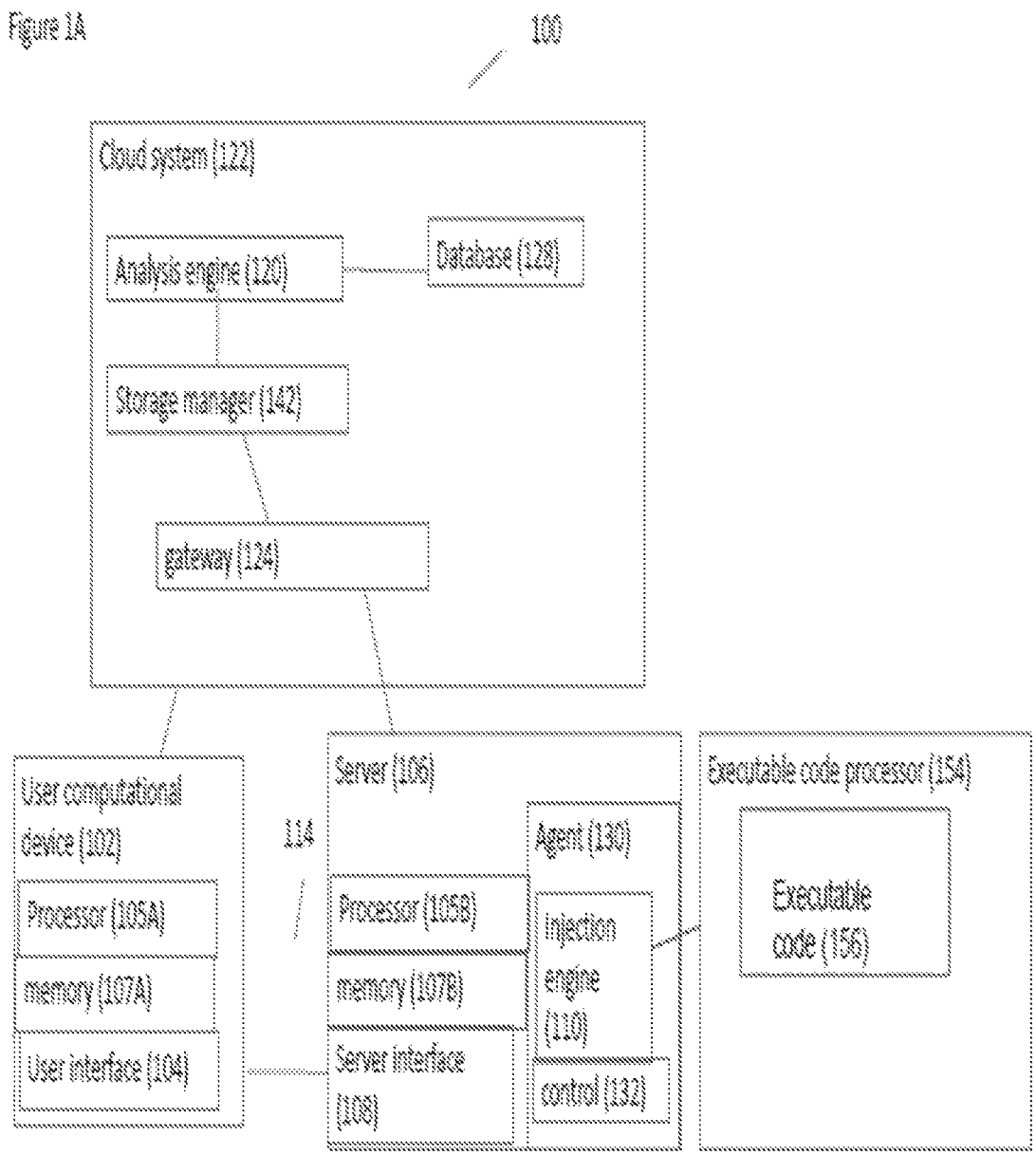
FIGS. 1A and 1B show non-limiting exemplary systems for selecting one or more probes for injection into executable code for execution.

The present invention, in at least some embodiments, is of a system and method for providing probes for injection to binary or executable code, which may also be determined to be executable-ready code.

A probe is a small piece of code, which may comprise only a few instructions, that is injected to executable code, whose purpose is to tell if a certain functionality was used, and if so, how many times. A probe should have no effect on the logic of the user code. For example, the name of the probe is passed as a string. When called, the counter for that probe is increased.

Different types of probes have different associated costs. For example, class probes tell whether the class was loaded or not. These have the lowest impact on CPU since they typically loaded once in the lifetime of the application. They also have the lowest impact on RAM since there are less probes to keep track of, when compared to method and instruction probes. Finally, they provide a positive/negative indication of whether the class was loaded or not.

Method probes tell whether the method was called or not. They may have a higher impact on the CPU since a method may be called multiple times, and while each call has a minimal impact on runtime, that impact adds up and make slow down the application noticeably. Additionally, there are typically more methods than classes, so more memory is allocated for those probes. Finally, every probe should save the hit count, which is a positive integer.

Instruction probes tell whether an instruction was called or not. They are similar to method probes, and while they provide a higher resolution of coverage collection, they are even more costly than method probes in terms of CPU and RAM for the same reasons described above. A non-limiting example of such a probe, given in comparison to the original code (that is, the code that performs one or more functions as experienced and/or invoked by a user), is given below.

| Original "user" code: | Instrumented code with a single probe: |
|---|---|
| public int add(int num1, int num2) {<br>  return num1 + num2;<br>} | public int add(int num1, int num2) {<br>  Coverage.ReportProbeHit("int add(int, int)");<br>  return num1 + num2;<br>} |

The cost of a probe may be determined as follows. Each probe requires two pieces of information—the identity of the probe (e.g. what it represents) and its hit information. A boolean probe, like the class-level probe, can ideally take a single bit of RAM. A numeric probe, like the method-level and instruction-level probe, can take a few bytes to store an unsigned integer.

For example, suppose that there are three methods, a, b and c. Suppose that a always calls b, while method c may call a or b. In this example, method probes can be set in either method a( ), method b( ) or both. However, since a( ) always calls b( ), it is sufficient to place a probe in a( ) and later infer that b( ) was called. This example can be extended with statistical branch prediction algorithms. It can be seen that c( ) may call a( ) or b( ), so placing a probe in c( ) can be used instead of either a or b.

In general, it may be desired to only insert a probe in some areas of code and/or to cause it to be invoked at specific times, for example to reduce impact. Placement of the probes within the code, or on certain machines, or with certain functions, determines the impact on performance. It is desirable to reduce impact on performance. On the other hand, it is also desirable to obtain the information in a time sensitive manner, without excessive delays.

Without wishing to be limited by a closed list, some methods to limit the impact of probes may include one or more of the following:

1. Dynamically injecting temporary probes for a short duration, periodically. Using this approach, statistically significant data is collected over a short period of time (e.g. the first 5 minutes of every hour). The probe has an impact on the CPU only during this period, at the end of which it is removed to no longer impact runtime.

2. Placing probes on a subset of performance and/or time sensitive machines where user traffic is load balanced. If a setup has 10 machines, the "listener agent" can be placed on any subset of them, and still collect meaningful data. Such data may then be aggregated at a later stage.

3. Inject probes only to a limited set of "probe candidates" that may be sorted by priority. With this approach, every "listener agent" can randomly choose a set S1 of N probes from a set S2 of M probes that are given by an input. S2 can also include weights, in case probes have different priorities. When used in combination with technique (1) above, S1 can be re-calculated before a collection period.

4. Using an unsafe increment operation inside probes. Maintaining a correct hit count can slow down a multi-threaded application, since every counter increment operation should be "atomic". However, a high level of correctness is not needed for the purposes described above, and a more "fuzzy" (and much faster) increment operation can still give a good rough indication to the number of hits. This operation can be described in pseudo-code as:

LOAD Counter into the stack
  INCREMENT the counter
  STORE counter from the stack In this case, if two threads were to execute this code, and the counter was initially 0, the result counter value can be either 1 or 2. Again, for the requirements listed above, this level of granularity is insignificant, as long as the deviation is kept "reasonable".

5. Turning off a probe whose hit count reached a certain threshold, in order to reduce impact on the CPU. By "turning off" it means that the probe may stop executing, although it may remain in the code; or that the probe is removed, for example by returning the code to its earlier state, before the probe was injected.

6. Avoiding placing probes, or alternatively, assigning lower priority to probes in code that is known to be frequently used according to statistical analysis of historical data. As an example, if some infrastructure code is heavily used in the system (based on historical data), placing a probe will probably take a lot of CPU time. By lowering the priority of the probe injection, CPU time will not be hurt.

7. Dynamically injecting probes to random pieces of code. In addition to placing probes in known areas (as in (1)), the "listener agent" can add a few random probes of its own, in order to collect historical data for (8) above.

8. Dynamically choosing a probe placement per each class/method. The "listener agent" can implicitly choose, or explicitly be told to collect higher-resolution coverage from certain parts of the system, and lower-resolution coverage from other parts of the system. This can be even remotely be controlled by another component during runtime.

Optionally the probe injection is used to determine code coverage of binary or executable code. The code coverage may be determined for new code or modified existing code, as well as for previously determined code. For previously determined code, preferably, the code coverage is determined before the executable or binary is prepared. Alternatively, for such previously determined code, the code coverage is optionally determined after the executable or binary is prepared. For modified or new executable code, code coverage may be determined from the executable or binary itself.

In addition to determining test coverage, the use of injectable probes has other benefits. Without wishing to be limited by a closed list, these benefits further include increasing the speed and efficiency of the continuous integration (CI) cycle by either removing tests or running them less frequently, if the functionality they are testing is rarely or never used in production, and/or if the tests are duplicate or similar tests; and removal of dead or rarely used code.

As a non-limiting example, let there be 2 methods: M1, M2. M1 is more frequently used in production, or production-like environments than M2 (or even M2 is never used in production or production-like environments). The term "production or production-like environments" may encompass an environment in which the intended end-users of the software actually use the software in the current production version. Let there be 3 tests T1,T2,T3 covering those methods, as follows:
   i. T1. covers M1
   ii. T2 covers both M1 and M2
   iii. T3 covers only M2

In this case, if the user would like to speed up the CI pipeline, tests T2,T3 may be either removed or run less frequently. Between these two, T3 removal should take precedence over T2, as the latter still covers code that is being used in production. Similarly, tests T1, T3 may be removed or run less frequently, and so forth.

In terms of removal of dead or rarely used code, since more code requires more maintenance, engineers can use production insight to be able to discover areas of functionality that are rarely or never used, and choose to remove it.

Turning now to the Figures, FIG. 1A shows a non-limiting exemplary system, for selecting one or more probes for injection into executable code for execution. As shown in the system 100, there is provided a user computational device, operating user interface 104. User computational device 102 through user interface 104 optionally enables the user to control one or more processes related to the selection, and/or construction, and/or injection of the probes into executable code, as well as one or more processes related to selection of executable code. Optionally these processes may be performed automatically, optionally according to commands given to user interface 104. Also optionally the processes may be controlled by another external process or controller. The user may view code coverage for existing, new, or modified code and may also control such functions as scheduling of code testing and other functions through user interface 104.

User computational device 102 may communicate through a computer network 114 with the server 106. Server 106 features a server interface 108, which may interface between agent 130 and user interface 104. Agent 130 may communicate with cloud system 122 directly. Server interface 108 supports receiving commands from user interface 104 and passing information back to user interface 104. In addition server interface 108 receives commands from user interface 104 and then may pass them to an agent 130 and/or to a cloud system 122 described in greater detail below.

Agent 130 preferably controls the selection and/or creation and/or injection of probes into the executable code, as well as determining how the probes may be injected, and also how the execution may occur. Agent 130 may operate automatically or may operate manually or sort of manually, according to commands received from user interface 104. Agent 130 preferably comprises an injection agent 110 and the control 132. Control 132 may, for example, determine when agent 130 is operative. Agent 130 may receive commands from user interface 104, for example through server interface 108, to wake up agent 130 to cause it to perform its commands.

Control 132 also preferably controls an injection engine 110, which determines one or more of when, how and which probes are injected into the executable code. Injection engine 110 may also create or select the probes. Injection engine 110 preferably determines the cost of a particular probe, how a probe should be structured, which probes should be prepared and executed and may also determine scheduling and the weight of any particular probes in terms of the computational resources required. Injection engine 110 preferably causes one or more probes to be injected into an executable code 156 which is executed by an executable code processor 154. Executable code 156 may, for example, be code that has already been tested or may alternatively be code that has not yet been tested. Executable code 156 may also be code that is in production.

In order to assist the selection and/or injection of probes by agent 130, server 106 is also preferably in communication with cloud system 122 as is user computational device 102, preferably all through the computer network 114. Server 106 and user computational device 102 communicate with cloud system 122 and gateway 124, which supports passing of information between cloud system 122 and one or more external computational devices. Gateway 124 may for example comprise an API gateway, which may or may not interact with a database 128 as shown.

Gateway 124 may read information from and write information to a database 128 (not shown), which may then pass system information to server 106 which may in turn communicate with user computational device 102. Gateway 124 preferably communicates with the storage manager 142 and analysis engine 120. Analysis engine 120 may analyze the executable code 156, and/or which executable code processor 154 is executing on, as well as the probes, and the selection of the probes, and may even also construct the probes, for example as described in greater detail below. Analysis engine 120 may cause information to be stored in database 128, which may, for example, be historical information.

Analysis engine 120 may, therefore, assist injection into 110 and procreation into a section for probes, and/or may provide instructions to agent 130 as to when the probes should be injected and to which computational device.

User computational device 102 also comprises a processor 105A and a memory 107A. Functions of processor 105A preferably relate to those performed by any suitable computational processor, which generally refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory, such as a memory 107A in this non-limiting example. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 107A is configured for storing a defined native instruction set of codes. Processor 105A is configured to perform a defined set of basic operations in response to receiving a corresponding basic instruction selected from the defined native instruction set of codes stored in memory 107A. For example and without limitation, memory 107 may store a first set of machine codes selected from the native instruction set for receiving information about the executable code to which probes are to be injected, a second set of machine codes selected from the native instruction set for analyzing the executable code to determine a plurality of potential probes for injection and a third set of machine codes selected from the native instruction set for selecting probes for injection from the potential probes according to a cost of injection.

Similarly, server 106 preferably comprises a processor 105B and a memory 107B with related or at least similar functions.

Figure 1B:
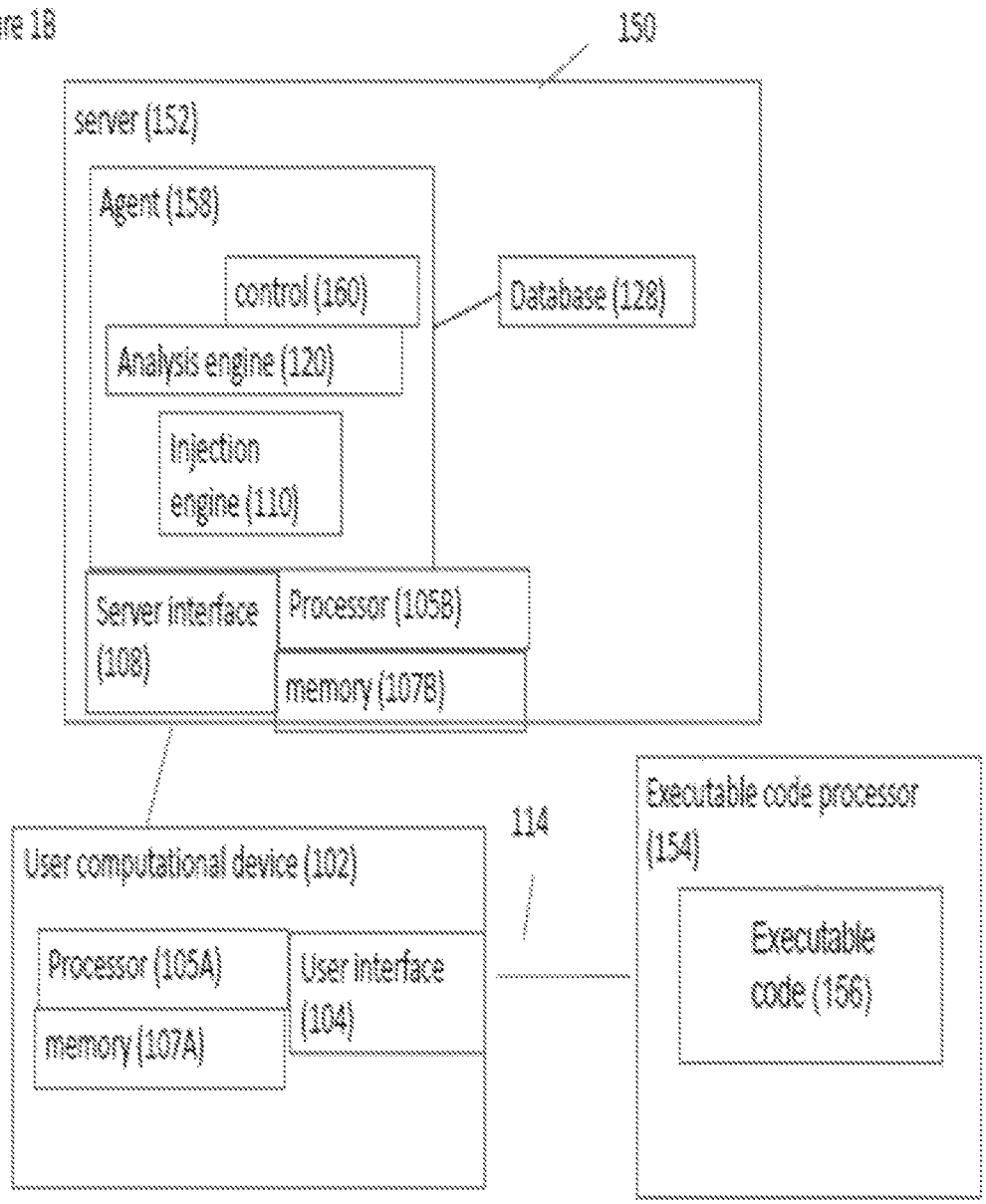

FIG. 1B shows another configuration of a system 150 with similar references as to system 100, except that the cloud system 122 is not present. Components with the same reference numerals have the same or similar function. For this system 150, in this embodiment of the system, server 152 operates in agent 158, which again features control 160 and injection engine 110. Now Agent 158 also features analysis engine 120, which is perfectly controlled by control 160. The previously described functions of analysis engine 120 now be performed through agent 158, for example instead of the previously described cloud interface.

User computational device 102 through user interface 104 may now pass commands directly to executable code processor 154, and/or to agent 158 through server interface 108.

FIG. 2 shows a non-limiting exemplary method according at least some embodiments for creating and/or selecting one or more probes and then determining their effect on injecting into the code. As shown in a flow 200, agent is started or activated at 202. The agent may be active all the time and maybe listening for a command and/or the agent may sleep and may only be activated upon receiving the command and/or upon determining that the condition exists such that the agent should be activated which may, for example, be determined according to amount of time that has lapsed.

Next code is analyzed in 204. This is the executable code which may be analyzed to determine if probes should be injected, and if so, which probes and also when. In 206 when new probes are created, optionally, in this step, one or more probes are selected from existing probes.

In 208 the probe was injected into the executable code. For example, by injecting into code that is being executed by an executable code processor as previously described the effect of the probe upon injection is then analyzed in 210, and the probe results are provided in 212. The probe's results may, for example, be provided to these computational devices and/or to the user interface and/or to the agent and/or to the analysis engine. They may also optionally be stored it in the database as previously described.

Figure 3A:
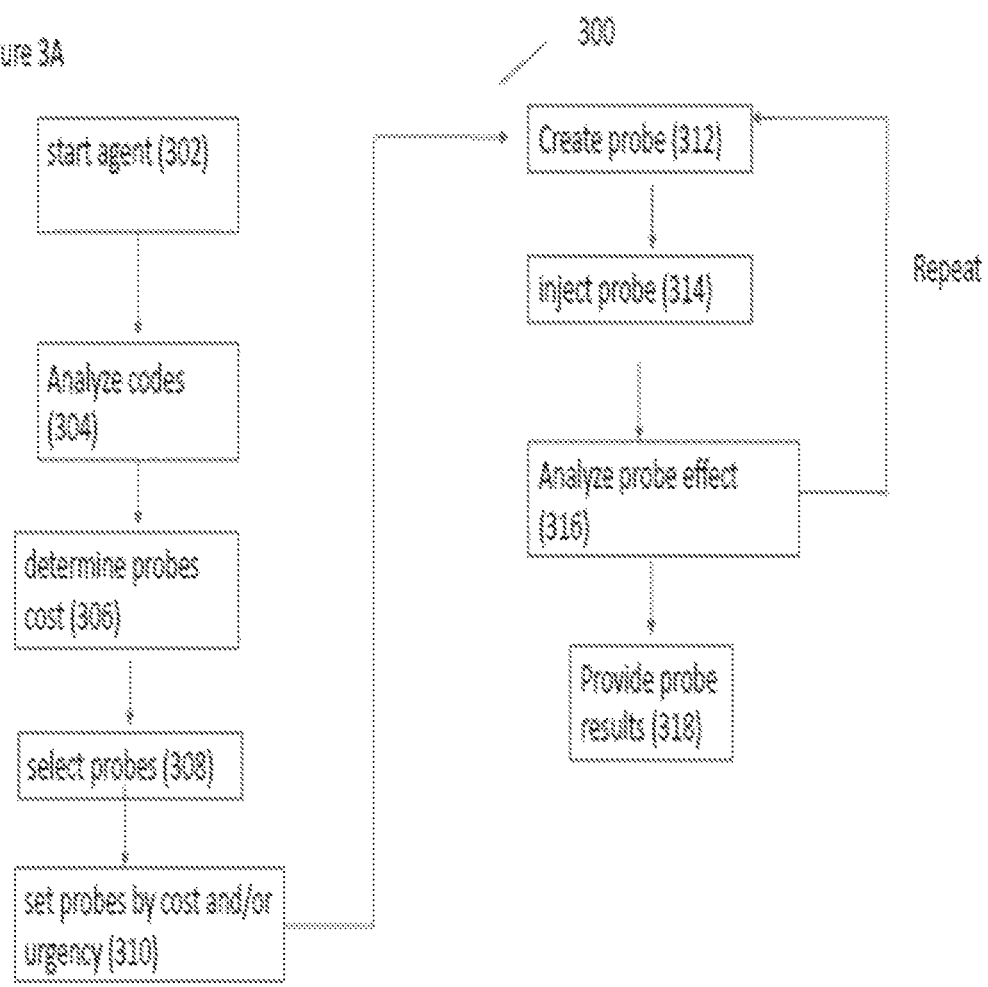

FIG. 3A shows a non-limiting exemplary method for determining the cost of probes enhanced to select probes according to their cost and/or other factors. As shown in the method 300, with regard to the agent in step 302, an agent has started as previously described, and the codes are analyzed in step 304 also as previously described. Now, however, the cost of one or more probes is determined in step 306. This may be determined according to the probes themselves and/or according to the executable code, and/or according to a combination thereof.

Cost may be determined according to resources required or their not being executional, or executable code is slowed down. The strains or burdens already placed on computation resources needed to execute the code and so forth.

Next, in step 308, probes may be selected. Optionally, steps 306 and 308 are performed in reverse, such that probes are selected or created first and after that their cost is determined. If the probes are selected in step 308 after the cost is determined, 306 then preferably the function of cost has at least an effect on their selection step 308.

Next, the probes are set by cost and/or urgency, and/or other factors in step 310. Urgency may be determined according to whether or not one of the rules indicate that a probe should be set to, for example, according to test coverage as is described in greater detail below. Or according to other factors, such as, for example, the mission-critical factors related to the code itself, and/or whether the code needs to be tested before being put into production and/or released for new production hold.

After the probes have been set by cost and/or urgency in step 310, and/or other factors, then the probes are created. By created in step 312 it is meant that the probes may be selected from an existing set, may be adjusted according to the cost, or may otherwise be determined in step 312.

In step 314 the probe is injected, and the effect is analyzed in step 316 as previously described. Optionally the cycle is repeated, since the steps of 312 to 316 may be performed more than once until one or more predetermined criteria met. Which may, for example, relate to test coverage as described in further detail below. Next, the probe is also provided in 318 as previously described.

FIG. 3B relates to when one limited exemplary method for injecting probes according to greater efficiency requirements and/or costs. As shown in the message for step 350, probes are considered for the code in 352. Optionally the code probes have already been determined and/or selected and/or provided.

In 354, the cost of the probe is determined as previously described. Next, the lowest static cost is determined in 356. The lowest static cost relates to the cost of the probes according to a static analysis of the executable code. This process may be repeated, such as 352 to 356, may be performed more than once. After this process has been performed, such as that probes are determined which have the lowest static cost, then probes are selected 358.

Probe injection timing is then evaluated in 360. Depending upon the computational resources required for executing the code and/or other strains being placed on these resources by other requirements and/or other factors, such as the need, for example, execute the code according to a certain speed or efficiency. The timing of the probe injection may be determined, especially, for example, immediately determined that it is better to proceed immediately or alternatively it is better to wait.

After step 360 is been performed, and 362 machine placement is evaluated, this is because it may be possible to inject the probes onto code in no more than one machine and/or more than one other computational resource. And in this case, it may be determined that it is better to select a certain machine or computational resource over others.

Fuzzy counting may then be evaluated in 364 in which the probes are not required to report frequently in order to reduce computational costs. Optionally, steps 360 to 364 are repeated in 366.

Figure 4:
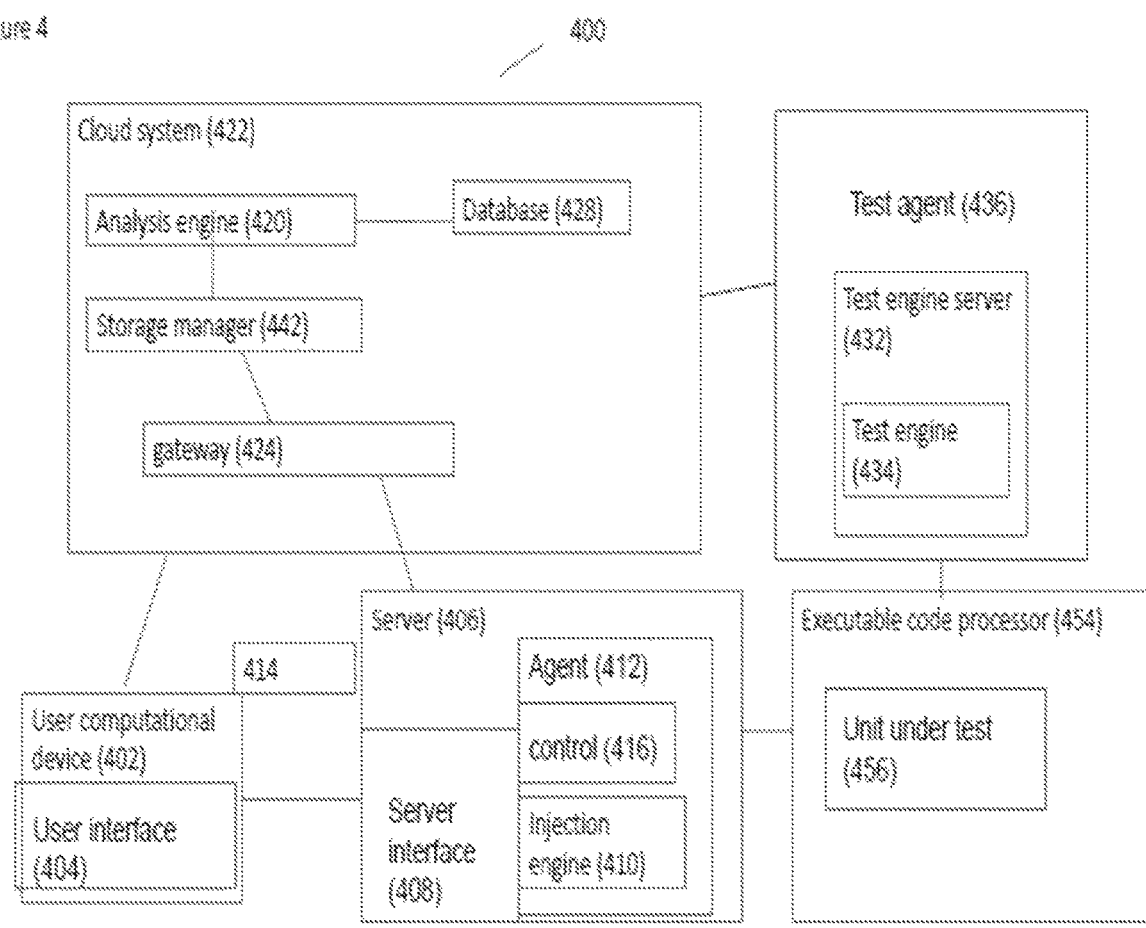
FIG. 4 shows a system which is similar to that of FIG. 1A, except in this non-limiting example, the system also includes a test agent and a coverage computational device.

As shown in FIG. 4, there is provided a system which is similar to that of FIG. 1A, except in this non-limiting example, the system also includes a test agent and a coverage computational device. Components such as processor 105A and memory 107A are also present but are not shown for clarity. As shown in a system 400, again user computational device 402, user interface 404, a computer network 414, server 406, server interface 408, and agent 412, and control 416, and injection engine 410, executable code processor 454, a cloud system 422, an analysis engine 420, a storage manager 442, a gateway 425, database 428, which all may have similar or the same functions to those components with the same names as named in FIG. 1A.

In the system 400, now executable code processor 454 is executing a unit 100 test 456. The test agent 436 monitors the behavior of unit under test 456 and causes one or more tests to be performed. These tests may perform through a test engine server 432 and a test engine 434. Test engine 434 preferably determines the code coverage for new, modified, or existing code and may also receive information from cloud system 422 regarding previous tests. Test engine 434 may then calculate the effect of a new test as to whether or not it will increase code coverage or whether it will not increase test code coverage, and in particular test coverage for specific code.

User computational device 402 or server 406 may pass instructions to cloud system 422 through computer network 414 and, hence, to gateway 424. From gateway 424, data transmission may be bifurcated. Information, such as the results of tests, test coverage, and other information, often also including the weight of various probes and the probe tests that may be required, are sent first to a storage manager 442 and then to analysis engine 420. Analysis engine 420 determines whether or not test code coverage should be updated, how it should be updated, whether any code has not been tested, and so forth. This information is stored in database 428 and it is also passed back to gateway 424 and, hence, to server 406 and/or user computational device 402. In addition, information from user computational device 402, such as one or more commands, as entered by the user through user interface 404, may also be passed to gateway 424 and then stored in database 428. This information may provide a log or trail of commands that were issued and that need to be performed by server 406, or alternatively by cloud system 422.

FIG. 5 shows a non-limiting exemplary method for determining code which may be executed according test coverage. As shown in the method 500, executable code is reviewed in 502. If new code is detected in 504 that is code in a class or module which has never been tested, as if it has not yet been provided in 504, then it is flagged for urgent testing in 504A. If modified code is detected in 506, then that is flagged for testing in 506A. By modified coded, it is meant to class and/or module and/or other software component which has some code which was previously executed, and some code which is new and was not.

If the modified code had been previously tested that is the part which is not modified in 506B, then the process continues on to 510. Otherwise, it is flagged for urgent testing in 506B. If untested previous code is detected either from 506 or from 504 in 510 then it is flagged for testing in 510A. Urgent probes are set in 512 and then the remaining probes are set in 514. The probes are then injected in 506.

For example, the above system and method may be used to detect code that is not covered by tests and is in use in the production systems. By releasing untested code to production, there is a high risk of regressions, bugs and other changes in behavior that may go unnoticed. As a non-limiting example, suppose an engineer modified 3 methods, termed M1,M2 and M3. However, methods M1,M2 were not covered by tests (e.g. unit tests), while M3 was covered by some tests. M1,M3 are already in use in production before the change, while M2 is not yet in production.

In this case, if the engineer wishes to add tests, M1 may be assigned a higher priority over M2 since it was modified and used in production. M3 is already tested, so it may have the lowest priority of the three. The method focuses on code that is useful to end users and that is actually in use, but has not been tested. The method may use static analysis to decide where to place the probes. Optionally, using static analysis but with no prior information on the code, the method finds the best place to put probes for monitoring.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for injecting probes to executable code, comprising a first computational device, said first computational device comprising a probe engine for determining one or more probes for injection; a second computational device comprising a probe analyzer for determining a cost of injecting said probe, wherein said probes for injection are selected according to said cost and according to an amount of code coverage, and an execution processor for executing the executable code, in which the probes are injected from the probe engine to the executable code, which is then executed to determine code coverage according to probe execution performance; wherein said probe engine determines said one or more probes for an amount of coverage with a predefined performance impact wherein said probe engine determines said amount of coverage according to statistical analysis; wherein said statistical analysis is performed to determine one or more time sensitive and/or performance sensitive measures for probe injection; and wherein said execution processor comprises a plurality of execution processors and said probe engine dynamically injects said probes to a subset of said execution processors.

2. The system of claim 1, wherein said measures determine coverage information from production systems with predefined impact on the CPU and RAM resources of the execution processor.

3. The system of claim 1, wherein said probe engine dynamically injects said probes for a predefined duration over a periodic plurality of times.

4. The system of claim 1, further comprising a plurality of listener agents, each agent being operated by said first or second computational device, each agent receiving results from injecting said probes and sending said results to said probe engine for analysis to determine said coverage.

5. The system of claim 4, wherein each listener agent selects a subset of probes from said probe engine for injection to said executable code of each execution processor.

6. The system of claim 4, wherein at least one listener agent randomly selects executable code for injection and selects a probe for injection according to said randomly selected executable code.

7. The system of claim 1, wherein said probe engine dynamically injects said probes until said probes have been executed a maximum number of times.

8. The system of claim 1, wherein said probe engine dynamically injects said probes to a portion of said execution code.

9. The system of claim 8, wherein said portion is selected from the group consisting of a class and a method.

10. The system of claim 8, further comprising a listener agent, wherein said listener agent dynamically selects probe placement for a plurality of different portions of code.

11. The system of claim 1, wherein said probe engine dynamically injects said probes and assigns a lower priority to probes in code having a higher frequency of use according to statistical analysis of historical data.

12. The system of claim 1, wherein each computational device comprises a processor and a memory, wherein said memory stores a defined native instruction set of codes; wherein said processor is configured to perform a defined set of basic operations in response to receiving a corresponding basic instruction selected from said defined native instruction set of codes; wherein said first computational device comprises a first set of machine codes selected from the native instruction set for receiving information about said executable code, a second set of machine codes selected from the native instruction set for analyzing said executable code to determine a plurality of potential probes and a third set of machine codes selected from the native instruction set for selecting said probes for injection from said potential probes according to said cost.

13. The system of claim 1, wherein said first and second computational devices are the same computational device.

14. The system of claim 1, wherein said statistical analysis is performed to optimize selection of probes according to impact on runtime as calculated according to a number of times each probe is executed, an amount of memory required for execution and processing time required for execution.

15. A system for injecting probes to executable code, comprising a first computational device, said first computational device comprising a probe engine for determining one or more probes for injection; a second computational device comprising a probe analyzer for determining a cost of injecting said probe, wherein said probes for injection are selected according to said cost and according to an amount of code coverage, wherein in said selection of probes for injection according to said cost, a lowest static cost of the probes is determined according to a static analysis of the executable code and probes which have the lowest static cost are selected, and an execution processor for executing the executable code, in which the selected probes are injected from the probe engine to the executable code, which is then executed to determine code coverage according to probe execution performance; wherein said probe engine determines said one or more probes for an amount of coverage with a predefined performance impact wherein said probe engine determines said amount of coverage according to statistical analysis; wherein said statistical analysis is performed to determine one or more time sensitive and/or performance sensitive measures for probe injection; and wherein said execution processor comprises a plurality of execution processors and said probe engine dynamically injects said probes to a subset of said execution processors.

16. The system of claim 15, wherein said selection of probes for injection according to said cost is further determined to optimize selection of probes according to impact on runtime as calculated according to a number of times each probe is executed, an amount of memory required for execution and processing time required for execution.

* * * * *